US011999409B2

(12) United States Patent
Schulz et al.

(10) Patent No.: US 11,999,409 B2
(45) Date of Patent: Jun. 4, 2024

(54) ELECTROMAGNETIC BRAKE MECHANISM FOR STEERING COLUMN ENERGY ABSORPTION SYSTEM

(71) Applicant: Steering Solutions IP Holding Corporation, Saginaw, MI (US)

(72) Inventors: John F. Schulz, Hemlock, MI (US); Michael P. Anspaugh, Bay City, MI (US); Randy W. Jones, North Branch, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 77 days.

(21) Appl. No.: 17/665,047

(22) Filed: Feb. 4, 2022

(65) Prior Publication Data

US 2023/0249739 A1    Aug. 10, 2023

(51) Int. Cl.
*B62D 1/18* (2006.01)
*B62D 1/181* (2006.01)
*B62D 1/19* (2006.01)

(52) U.S. Cl.
CPC ............. *B62D 1/197* (2013.01); *B62D 1/181* (2013.01); *B62D 1/192* (2013.01)

(58) Field of Classification Search
CPC ........ B62D 1/197; B62D 1/181; B62D 1/192; B62D 1/20; B62D 9/005; B62D 11/08; F16D 65/18; F16D 41/08
See application file for complete search history.

(56) References Cited

U.S. PATENT DOCUMENTS

| | | | |
|---|---|---|---|
| 2018/0037250 A1* | 2/2018 | Kreutz | B62D 1/187 |
| 2019/0185043 A1* | 6/2019 | Bueker | B62D 1/184 |
| 2020/0047764 A1* | 2/2020 | Yamashita | B60W 30/18145 |
| 2020/0398885 A1* | 12/2020 | Pichonnat | B62D 1/195 |
| 2021/0293293 A1* | 9/2021 | Krause | F16K 31/04 |

\* cited by examiner

*Primary Examiner* — Zakaria Elahmadi
(74) *Attorney, Agent, or Firm* — Dickinson Wright PLLC

(57) ABSTRACT

An energy absorption system for a vehicle steering column includes a lower jacket. The energy absorption system also includes an upper jacket operatively coupled to, and moveable relative to, the lower jacket. The energy absorption system further includes a tooth rack operatively coupled to the upper jacket. The energy absorption system yet further includes an electromagnetic brake mechanism engageable with the tooth rack to exert a braking force on the tooth rack.

16 Claims, 5 Drawing Sheets

ELECTROMAGNETIC BRAKE MECHANISM FOR STEERING COLUMN ENERGY ABSORPTION SYSTEM

TECHNICAL FIELD

The following description relates to vehicle steering column assemblies, and more particularly, to an electromagnetic brake mechanism for a steering column energy absorption system.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions to provide flexibility in the location of the hand wheel and facilitate more comfortable driving positions for different sizes of drivers or autonomous driving capability.

In addition to providing adjustability, axially adjustable steering column assemblies may also include a collapsible functionality that provides safety advantages during an energy absorption event. A tunable energy absorber and a positive lock system may be utilized in a manner that results in the energy absorption to begin immediately regardless of the adjustment position of the steering column. Adaptive energy absorptions systems based on pyrotechnic actuation have also been in use, but have been limited to either a high or low energy absorption setting. Additional discrete settings could be added, but would result in complexity and cost.

SUMMARY

According to one aspect of the disclosure, an energy absorption system for a vehicle steering column includes a lower jacket. The energy absorption system also includes an upper jacket operatively coupled to, and moveable relative to, the lower jacket. The energy absorption system further includes a tooth rack operatively coupled to the upper jacket. The energy absorption system yet further includes an electromagnetic brake mechanism engageable with the tooth rack to exert a braking force on the tooth rack.

According to another aspect of the disclosure, an energy absorption system for a vehicle steering column includes a lower jacket. The energy absorption system also includes an upper jacket operatively coupled to, and moveable relative to, the lower jacket, the upper jacket having a plurality of jacket teeth formed on an outer surface of the upper jacket. The energy absorption system further includes an electromagnetic brake mechanism engageable with the plurality of jacket teeth to exert a braking force on the upper jacket.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
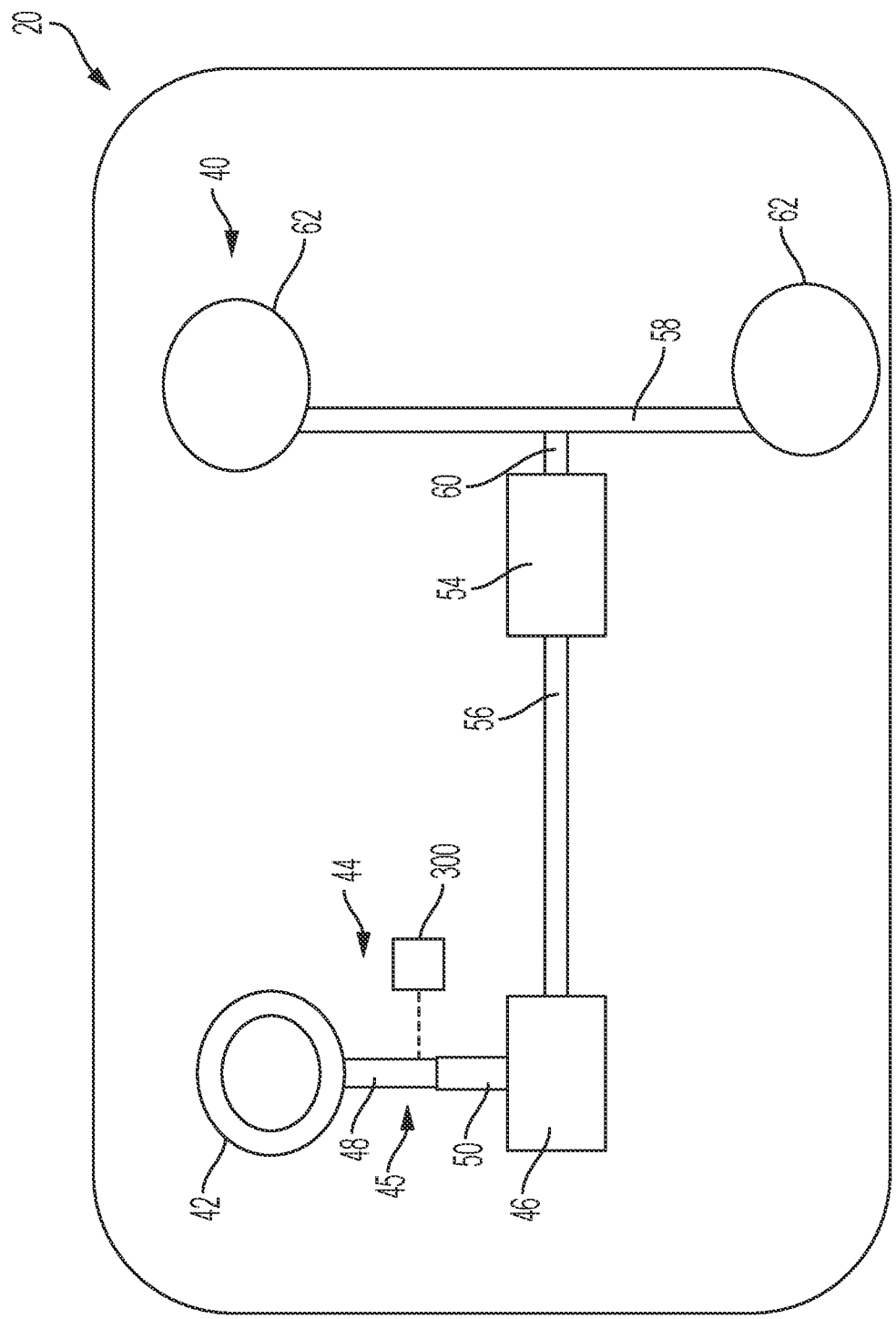
FIG. 1 generally illustrates a steering system according to the principles of the present disclosure.

The following discussion is directed to various embodiments of the disclosure. Although one or more of these embodiments may be discussed or illustrated in greater detail, the embodiments disclosed should not be interpreted as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Referring now to the drawings, where the various embodiments are shown and described herein, without limiting same, illustrated are embodiments of a steering column assembly that is axially adjustable and includes an energy absorption system with improved dependability, is highly customizable and provides other operational benefits. The axial adjustability can result from relative movement between two or more jackets that permit axial movement therebetween. For example, a first jacket and a second jacket move in a relative telescopic, sliding, or translational configuration.

Referring initially to FIG. 1, a steering system 40 for a vehicle is generally illustrated according to the principles of the present disclosure. The vehicle may include any suitable vehicle, such as a car, a truck, a sport utility vehicle, a mini-van, a crossover, any other passenger vehicle, any suitable commercial vehicle, or any other suitable vehicle. Moreover, principles of the present disclosure may apply to other vehicles, such as planes, boats, trains, drones, or other suitable vehicles.

The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. An airbag device may be located on or near the input device 42. A steering column assembly 44 extends along an axis from the input device 42 to an output assembly 46. The output assembly 46 may include a pinion shaft assembly, an I-shaft, a cardan joint, steer-by-wire components or any other features conventionally located opposite the input device 42. The steering column assembly 44 may include at least two axially adjustable parts, for example, a first jacket 48 (also referred to as an upper jacket 48) and a second jacket 50 (also referred to as a lower jacket 50) that are axially adjustable with respect to one another. The first jacket 48 and the second jacket 50 may be alternatively configured as brackets, rails, or other members that permit axial movement therebetween. The axial movement may include sliding, telescopic, translating, and other axial movements. The steering column assembly 44 may include a mounting bracket that at least partially connects the steering column to the vehicle 20.

The steering column assembly 44 is moveable between a range of positions from an extended position to a retracted position. In the extended position, the first jacket 48 and second jacket 50 are moved axially away from each other so that the input device 42 is located near an operator of the vehicle. In the retracted position, the first jacket 48 and second jacket 50 are moved axially towards each other so that the input device 42 is located away from an operator of the vehicle. In some embodiments, the retracted position may correspond to stowing the input device 42. For example, it may be beneficial to place the input device 42 in a stowed location during autonomous driving.

A steering gear assembly 54 may connect to the output assembly 46 via a steering gear input shaft 56 in embodiments where a mechanical connection is present, but it is to be appreciated that an output assembly 46 and/or input shaft 56 may not be present in some steering systems, such as a steer-by-wire system, for example. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axel to turn the wheels 62.

Figure 2:
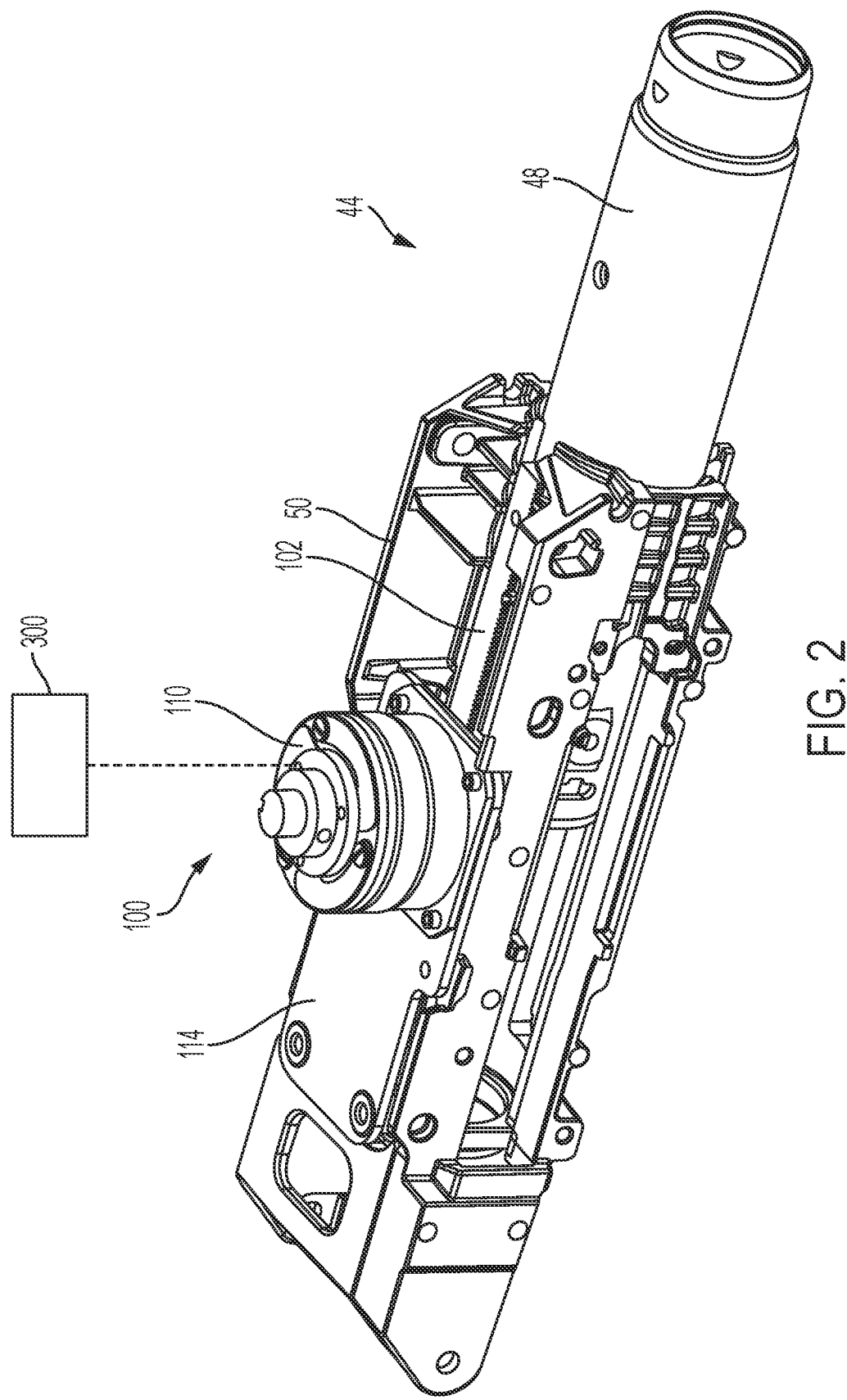
FIG. 2 is a perspective view of a steering column energy absorption system according to a first aspect of the disclosure.

FIG. 2 illustrates an energy absorption system 100 used to absorb energy during a collapsing condition of the steering column assembly 44. The upper jacket 48 and the lower jacket 50 are shown and the upper jacket 48 is axially translatable relative to the lower jacket 50, as described above. An energy absorbing electromagnetic brake mechanism 110 is coupled to the upper jacket 48 via a tooth rack 102 and to another steering column component, such as the lower jacket 50 or the mounting bracket, for example.

The energy absorbing electromagnetic brake mechanism 110 is engageable with tooth rack 102, linked to the upper jacket 48, to provide a variable braking force on the upper jacket 48 via the tooth rack 102 to adjust the energy absorption characteristics during collapsing of the steering column assembly 44. In contrast to discrete braking force settings in the form of a high and a low setting, the electromagnetic brake mechanism 110 facilitates a braking force exerted on the upper jacket 48 via the tooth rack 102 which is adjustable over a continuous range between a low force setting and a high force setting. In other words, any braking force between the low force setting and the high force setting is achievable, rather than discrete settings, such as ON/OFF or HIGH/LOW.

Figure 3:
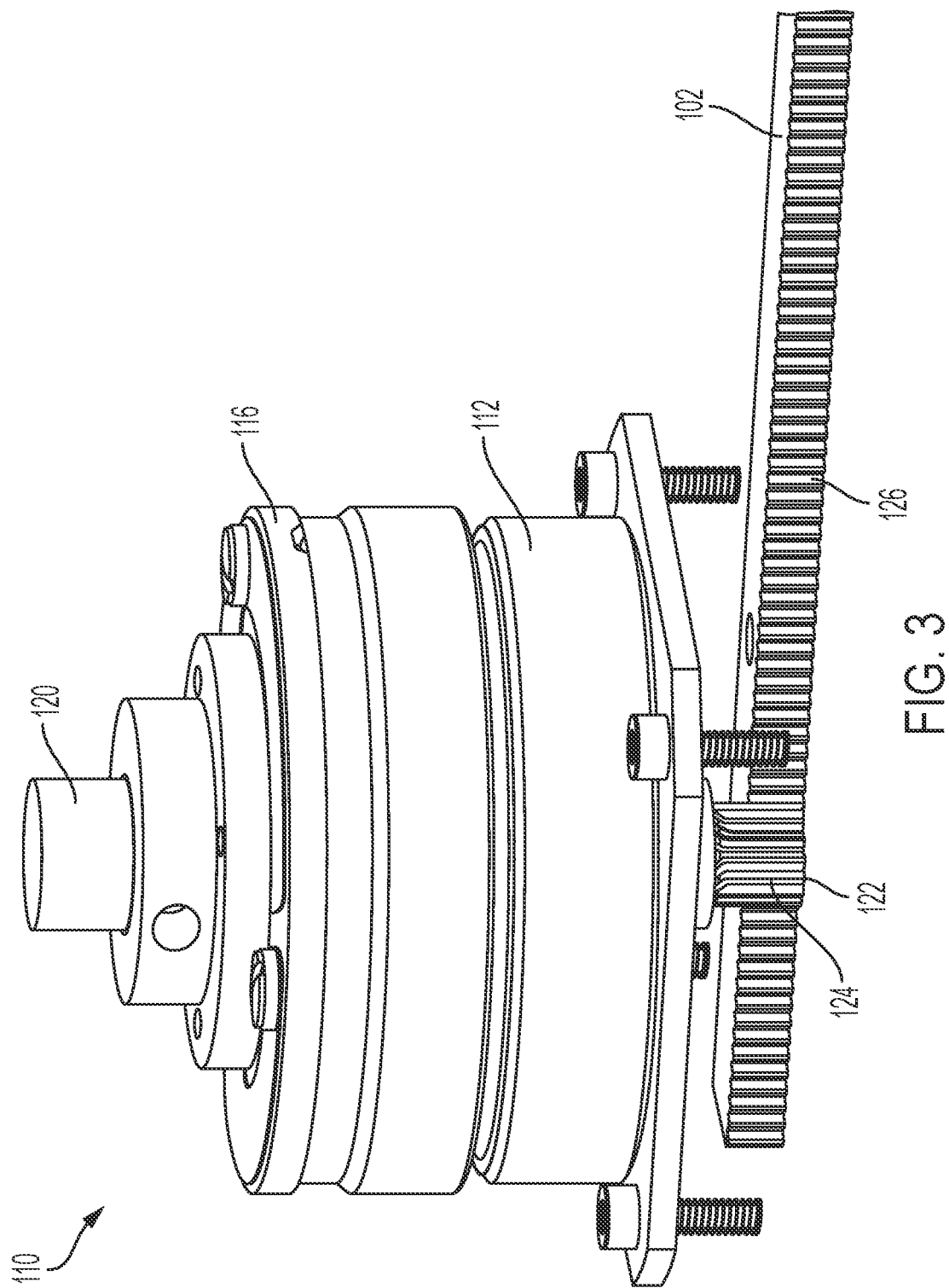
FIG. 3 is a perspective view of an electromagnetic brake mechanism of the steering column energy absorption system of FIG. 2.
Figure 4:
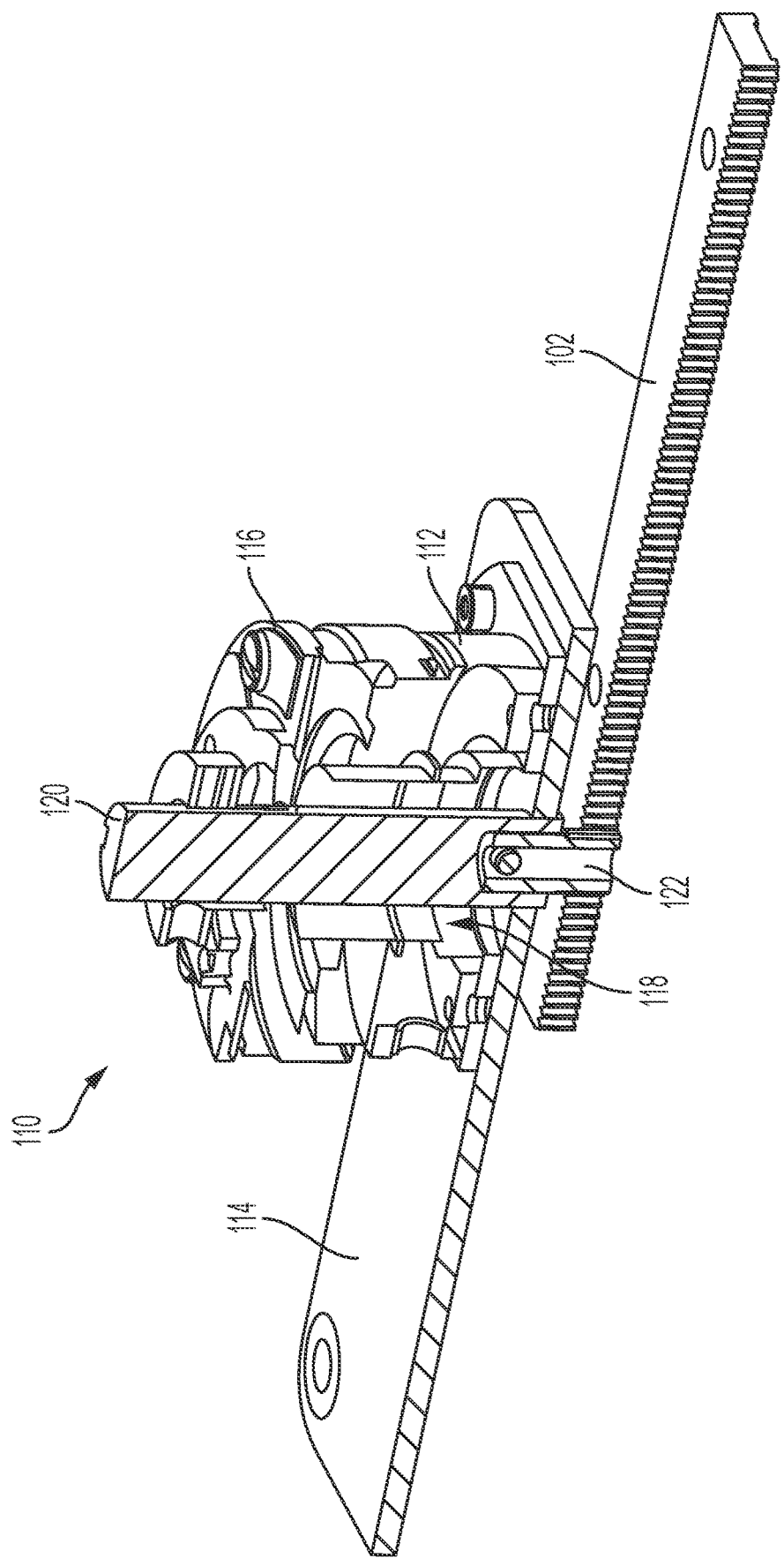
FIG. 4 is a perspective, cross-sectional view of the electromagnetic brake mechanism of the steering column energy absorption system of FIG. 2.

Referring now to FIGS. 3 and 4, with continued reference to FIG. 2, the electromagnetic brake mechanism 110 includes a stationary portion 112 that is mounted to an attachment component 114 that is coupled to the second jacket 50 (FIGS. 2 and 4). In some embodiments, the stationary portion 112 may be mounted directly to the second jacket 50. A rotatable portion 116 of the electromagnetic brake mechanism 110 is disposed adjacent to the stationary portion 112 and together the stationary portion 112 and the rotatable portion 116 define a cavity 118. A rod 120 is located within the cavity 118 and is operatively coupled to the rotatable portion 116. At an end of the rod 120 is a pinion 122 having a plurality of pinion teeth 124 formed thereon. The pinion 122 may be integrally formed with the rod 120 or may be a separate component that is coupled thereto. The pinion teeth 124 are engaged with a plurality of rack teeth 126 formed on an edge or surface of the tooth rack 102. Translation of the tooth rack 102 causes rotation of the pinion 122 based on the interaction of the rack teeth 126 and the pinion teeth 124, which imparts rotation of the rod 120 and the rotatable portion 116.

The electromagnetic brake mechanism 110 can exert a braking force on the upper jacket 48 via the tooth rack 102 by increasing the resistance to rotation of the rotatable portion 116, the rod 120 and the pinion 122 based on an application of voltage applied to the electromagnetic brake mechanism 110. In other words, when zero voltage is applied, no resistance to rotation is present and the upper jacket 48 and the tooth rack 102 are opposed by no braking force from the electromagnetic brake mechanism 110. As the voltage increases, the rotatable portion 116 translates axially in a direction parallel to a longitudinal axis of the rod 120, thereby moving it toward the stationary portion 112. As the friction due to contact between the rotatable portion 116 and the stationary portion 112 increases, the braking force increases due to increased resistance to rotation of the rotatable portion 116, the rod 120 and the pinion 122, and therefore resistance to translation of the upper jacket 48 via the tooth rack 102.

The electromagnetic brake mechanism 110 is in operative communication with the control system 300, which includes hardware, software, modules, and/or sensor equipment, for example. The control system monitors at least one operational condition of the steering column assembly 44 and the braking force exerted on the tooth rack 102 is adjusted based on a command communicated by the control system 300 to the electromagnetic brake mechanism 110.

The at least one operational condition may be any contemplated condition monitored by a control system 300, such as deployment of an airbag, for example. In such an embodiment, the timing of a crash event can be used to make energy absorption adjustments for enhanced safety. For example, at a specific time (e.g., milliseconds) after the airbag is deployed, the voltage—and therefore the braking force—can be reduced to allow full or nearly full axial column stroke to improve the safety of an occupant. An additional example of an operational condition that may be monitored and influence the braking force selection is an axial stroke position of the upper jacket. In such an embodiment, a sensor measures the axial column stroke position and makes voltage—and therefore braking force—adjustments to achieve full or nearly full column stroke to improve driver safety. Additionally, the braking force can be set to a maximum to increase the breakaway load of the tooth rack 102 and then the voltage can be adjusted to achieve a specific or variable load as the steering column strokes axially. The preceding examples are merely illustrative and are non-limiting of the customized options that are available with the variable braking force provided by the electromagnetic brake mechanism 110.

In addition to using the electromagnetic brake mechanism 110 to resist collapsing movement in a first axial direction of the steering column assembly 44 (i.e., toward retracted position), the braking force may be applied in a second, opposite axial direction of movement of the upper jacket (i.e., retention force opposing movement toward extended position). Therefore, the braking force may provide braking in either direction of movement of the tooth rack 102, and therefore the upper jacket 48 to which the tooth rack is coupled.

Figure 5:
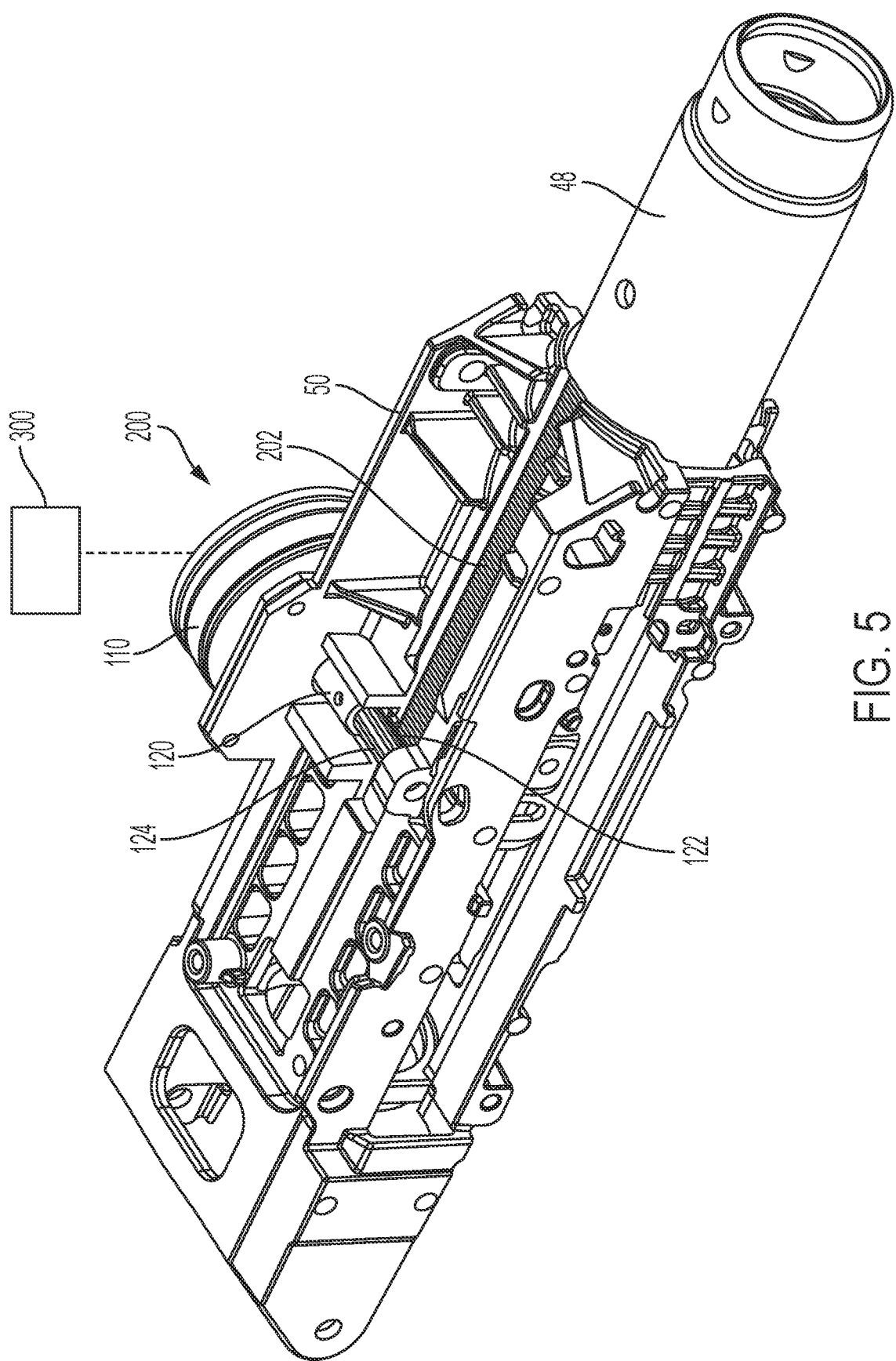
FIG. 5 is a perspective view of the steering column energy absorption system according to a second aspect of the disclosure.

Referring now to FIG. 5, the energy absorption system is shown according to a second embodiment and is generally referenced with numeral 200. The electromagnetic brake mechanism 200 is used to absorb energy during a collapsing condition of the steering column assembly 44. The upper jacket 48 and the lower jacket 50 are shown and the upper jacket 48 is axially translatable relative to the lower jacket 50, as described above. In the illustrated embodiment, the upper jacket 48 includes a plurality of jacket teeth 202 formed directly on an outer surface of the upper jacket 48.

The electromagnetic brake mechanism 200 is engageable with the jacket teeth 202 of the upper jacket 48 to provide a variable braking force on the upper jacket 48 to provide a positive locking assembly and/or adjust the energy absorption characteristics during collapsing of the steering column assembly 44. In contrast to discrete braking force settings in the form of a high and a low setting, the electromagnetic brake mechanism 200 facilitates a braking force exerted on the upper jacket 48 which is adjustable over a continuous range between a low force setting and a high force setting. In other words, any braking force between the low force setting and the high force setting is achievable, rather than discrete settings, such as ON/OFF or HIGH/LOW.

As described above, the electromagnetic brake mechanism 200 includes the stationary portion 112. In the illustrated embodiment, the stationary portion 112 is mounted to a stationary structure of the steering column assembly 44, such as the lower jacket 50, but other structures such as the mounting bracket are contemplated. The rotatable portion 116 of the electromagnetic brake mechanism 200 is disposed adjacent to the stationary portion 112 and together the stationary portion 112 and the rotatable portion 116 define the cavity 118. The rod 120 is located within the cavity 118 and is operatively coupled to the rotatable portion 116. At an end of the rod 120 is the pinion 122 having the plurality of pinion teeth 124 formed thereon. The pinion 122 may be integrally formed with the rod 120 or may be a separate component that is coupled thereto. The pinion teeth 124 are engaged with the plurality of jacket teeth 202 formed on an outer surface of the upper jacket 48. Translation of the upper jacket 48 causes rotation of the pinion 122 based on the interaction of the jacket teeth 202 and the pinion teeth 124, which imparts rotation of the rod 120 and the rotatable portion 116.

The electromagnetic brake mechanism 200 can exert a braking force on the upper jacket by increasing the resistance to rotation of the rotatable portion 116, the rod 120 and the pinion 122 based on an application of voltage applied to the electromagnetic brake mechanism 200. In other words, when zero voltage is applied, no resistance to rotation is present and the upper jacket 48 is opposed by no braking force from the electromagnetic brake mechanism 200. As the voltage increases, the rotatable portion 116 translates axially in a direction parallel to a longitudinal axis of the rod 120, thereby moving it toward the stationary portion 112. As the friction due to contact between the rotatable portion 116 and the stationary portion 112 increases, the braking force increases due to increased resistance to rotation of the rotatable portion 116, the rod 120 and the pinion 122, and therefore resistance to translation of the upper jacket 48.

The electromagnetic brake mechanism 200 is in operative communication with the control system 300, which includes hardware, software, modules, and/or sensor equipment, for example. The control system monitors at least one operational condition of the steering column assembly 44 and the braking force exerted on the upper jacket 48 is adjusted based on a command communicated by the control system 300 to the electromagnetic brake mechanism 200.

The at least one operational condition may be any contemplated condition monitored by a control system 300, such as deployment of an airbag, for example. In such an embodiment, the timing of a crash event can be used to make energy absorption adjustments for enhanced safety. For example, at a specific time (e.g., milliseconds) after the airbag is deployed, the voltage—and therefore the braking force—can be reduced to allow full or nearly full axial column stroke to improve the safety of an occupant. An additional example of an operational condition that may be monitored and influence the braking force selection is an axial stroke position of the upper jacket. In such an embodiment, a sensor measures the axial column stroke position and makes voltage—and therefore braking force—adjustments to achieve full or nearly full column stroke to improve driver safety. Additionally, the braking force can be set to a maximum to increase the breakaway load of the upper jacket 48 and then the voltage can be adjusted to achieve a specific or variable load as the steering column strokes axially. The preceding examples are merely illustrative and are non-limiting of the customized options that are available with the variable braking force provided by the electromagnetic brake mechanism 200.

In addition to using the electromagnetic brake mechanism 200 to resist collapsing movement in a first axial direction of the steering column assembly 44 (i.e., toward retracted position), the braking force may be applied in a second, opposite axial direction of movement of the upper jacket (i.e., retention force opposing movement toward extended position). Therefore, the braking force may provide braking in either direction of movement of the upper jacket 48.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. An energy absorption system for a vehicle steering column comprising:
   a lower jacket;
   an upper jacket operatively coupled to, and moveable relative to, the lower jacket;
   a tooth rack operatively coupled to the upper jacket; and
   an electromagnetic brake mechanism engageable with the tooth rack to exert a braking force on the tooth rack, wherein the electromagnetic brake mechanism comprises:
   a stationary portion operatively coupled to a steering column structure;
   a rotatable portion rotatable relative to the stationary portion;
   a rod operatively coupled to the rotatable portion and rotatable therewith; and
   a pinion directly coupled to the rod and rotatable therewith, the pinion having a plurality of pinion teeth directly engaged with a plurality of rack teeth formed on a surface of the tooth rack.

2. The energy absorption system of claim 1, wherein the braking force exerted on the tooth rack is adjustable over a continuous range between a low force setting and a high force setting.

3. The energy absorption system of claim 2, wherein the low force setting is zero (0) units of force.

4. The energy absorption system of claim 1, wherein the rod extends along a longitudinal axis within a cavity defined by the stationary portion and the rotatable portion, wherein the rotatable portion is translatable in a direction parallel to the longitudinal axis of the rod upon application of a voltage to selectively increase or decrease the braking force based on increasing or decreasing friction contact between the rotatable portion and the stationary portion.

5. The energy absorption system of claim 1, wherein the electromagnetic brake mechanism is in operative communication with a control system, the control system monitoring at least one operational steering column condition, wherein the braking force exerted on the tooth rack is adjusted based on a command communicated by the control system to the electromagnetic brake mechanism.

6. The energy absorption system of claim 5, wherein the at least one operational condition is deployment of an airbag.

7. The energy absorption system of claim 5, wherein the at least one operational condition is an axial stroke position of the upper jacket.

8. The energy absorption system of claim 1, wherein the braking force is applied in a first axial direction of movement of the upper jacket and in a second, opposite axial direction of movement of the upper jacket.

9. An energy absorption system for a vehicle steering column comprising:
   a lower jacket;
   an upper jacket operatively coupled to, and moveable relative to, the lower jacket, the upper jacket having a plurality of jacket teeth formed on an outer surface of the upper jacket;
   an electromagnetic brake mechanism engageable with the plurality of jacket teeth to exert a braking force on the upper jacket, wherein the electromagnetic brake mechanism comprises:
   a stationary portion operatively coupled to a steering column structure;
   a rotatable portion rotatable relative to the stationary portion;
   a rod operatively coupled to the rotatable portion and rotatable therewith; and
   a pinion directly coupled to the rod and rotatable therewith, the pinion having a plurality of pinion teeth directly engaged with the plurality of jacket teeth.

10. The energy absorption system of claim 9, wherein the braking force exerted on the upper jacket is adjustable over a continuous range between a low force setting and a high force setting.

11. The energy absorption system of claim 10, wherein the low force setting is zero (0) units of force.

12. The energy absorption system of claim 9, wherein the rod extends along a longitudinal axis within a cavity defined by the stationary portion and the rotatable portion, wherein the rotatable portion is translatable in a direction parallel to the longitudinal axis of the rod upon application of a voltage to selectively increase or decrease the braking force based on increasing or decreasing friction contact between the rotatable portion and the stationary portion.

13. The energy absorption system of claim 9, wherein the electromagnetic brake mechanism is in operative communication with a control system, the control system monitoring at least one operational steering column condition, wherein the braking force exerted on the upper jacket is adjusted based on a command communicated by the control system to the electromagnetic brake mechanism.

14. The energy absorption system of claim 13, wherein the at least one operational condition is deployment of an airbag.

15. The energy absorption system of claim 14, wherein the at least one operational condition is an axial stroke position of the upper jacket.

16. The energy absorption system of claim 9, wherein the braking force is applied in a first axial direction of movement of the upper jacket and in a second, opposite axial direction of movement of the upper jacket.

* * * * *